(12) United States Patent
Sedarat

(10) Patent No.: US 7,369,607 B2
(45) Date of Patent: May 6, 2008

(54) MULTICARRIER COMMUNICATION USING A TIME DOMAIN EQUALIZING FILTER

(75) Inventor: Hossein Sedarat, San Jose, CA (US)

(73) Assignee: 2Wire, Inc., San Jose, CA (US)

( * ) Notice: Subject to any disclaimer, the term of this patent is extended or adjusted under 35 U.S.C. 154(b) by 707 days.

(21) Appl. No.: 10/789,553

(22) Filed: Feb. 26, 2004

(65) Prior Publication Data

US 2005/0190871 A1 Sep. 1, 2005

(51) Int. Cl.
*H03H 7/30* (2006.01)

(52) U.S. Cl. .................. 375/229; 333/18; 708/323

(58) Field of Classification Search .............. 375/229, 375/350
See application file for complete search history.

(56) References Cited

U.S. PATENT DOCUMENTS

| | | | | |
|---|---|---|---|---|
| 4,384,355 | A * | 5/1983 | Werner | 375/234 |
| 5,285,474 | A | 2/1994 | Chow et al. | |
| 5,483,551 | A * | 1/1996 | Huang et al. | 375/219 |
| 5,524,125 | A * | 6/1996 | Tsujimoto | 375/347 |
| 5,627,859 | A * | 5/1997 | Parr | 375/229 |
| 5,952,914 | A * | 9/1999 | Wynn | 370/290 |
| 6,674,795 | B1 * | 1/2004 | Liu et al. | 375/231 |
| 7,031,669 | B2 * | 4/2006 | Vaidyanathan et al. | 455/84 |
| 2002/0163959 | A1 * | 11/2002 | Haddad | 375/229 |
| 2003/0035469 | A1 * | 2/2003 | Frank et al. | 375/150 |
| 2003/0112860 | A1 * | 6/2003 | Erdogan | 375/229 |
| 2003/0227967 | A1 * | 12/2003 | Wang et al. | 375/229 |
| 2004/0141548 | A1 * | 7/2004 | Shattil | 375/146 |
| 2004/0223449 | A1 * | 11/2004 | Tsuie et al. | 370/204 |
| 2006/0115030 | A1 * | 6/2006 | Erving et al. | 375/348 |

OTHER PUBLICATIONS

Franklin, Curt, "How DSL Works," How Stuff Works, http://computer.howstuffworks.com/dsl.htm/printable, printed Nov. 16, 2004.
Sedarat, Hossein, et al., "Impulse Noise Protection for Multi-Carrier Communication Systems", Submitted to IEEE ICASSP (2005).
Sedarat, Hossein, et al., "Multicarrier Bit-Loading in Presence of Biased Gaussian Noise Sources", IEEE Consumer Communication and Networking Conference, Jan. 2005.
Baccarelli, Enzo, et al., Novel Efficient Bit-Loading Algorithms for Peak-Energy-Limited ADSL-Type Multicarrier Systems, IEEE Trans on Signal Processing, vol. 50, No. 5, May 2002.
Sonalkar, Ranjan, et al., "An Efficient Bit-Loading Algorithm for DMT Application," IEEE Comm. Letters, vol. 4, pp. 80-82, Mar. 2000.

(Continued)

*Primary Examiner*—David C. Payne
*Assistant Examiner*—Leon-Viet Q Nguyen
(74) *Attorney, Agent, or Firm*—Blakely, Sokoloff, Taylor & Zafman, LLP

(57) ABSTRACT

Various methods and apparatus are described that use a filter. A receiver may be configured to receive multi-tone signals. The receiver has a Time Domain Equalizer filter employing an algorithm to shorten a length of an incoming impulse response to equal to or less than a guard period by calculating a minimum mean square error solution in combination with measuring an inter-symbol interference of a channel.

19 Claims, 5 Drawing Sheets

OTHER PUBLICATIONS

Campello, Jorge, "Optimal Discrete Bit Loading for Multicarrier Modulation Systems," IEEE International Symposium on Information Theory, Aug. 1998, Cambridge, MA.

Chow, Peter S., et al., "A Practical Discrete Multitone Transceiver Loading Algorithm for Data Transmission over Spectrally Shaped Channels," IEEE Trans. on Communications, vol. 43, No. 2, 1995.

Fischer, Robert F.H., et al., "A New Loading Algorithm for Discrete Multitone Transmission," IEEE, 1996, pp. 724-728.

Lampe, Lutz H.-J., et al., "Performance Evaluation of Non-Coherent Transmission over Power Lines," 8 pgs.

Henkel, Werner, et al., "Maximizing the Channel Capacity of Multicarrier Transmission by Suitable Adaptation of the Time-Domain Equalizer," IEEE, vol. 48, No. 12, Dec. 2000.

Lashkarian, Navid, et al., "Fast Algorithm for Finite-Length MMSE Equalizers with Application to Discrete Multitone Systems," IEEE 1999, pp. 2753-2756.

Melsa, Peter J.W., et al., "Impulse Response Shortening for Discrete Multitone Transceivers," IEEE vol. 44, No. 12, Dec. 1996, pp. 1662-1672.

Al-Dhahir, Naofal, et al., "Optimum Finite-Length Equalization for Multicarrier Transceivers," IEEE vol. 44, No. 1, Jan. 1996, pp. 56-64.

Leke, Achankeng, et al., "A Maximum Rate Loading Algorithm for Discrete Multitone Modulation Systems," IEEE 1997, pp. 1514-1518.

Bingham, John A.C., "Multicarrier Modulation for Data Transmission: An Idea Whose Time Has Come," IEEE, May 1990, pp. 5-14.

Arslan, G., et al., "Equalization for Discrete Multitone Transceivers to Maximize Bit Rate," IEEE, vol. 49, No. 12, Dec. 2001, pp. 3123-3135.

Farhang-Boroujeny, Behrouz, et al., "Design Methods for Time-Domain Equalizers in DMT Transceivers," IEEE, vol. 49, No. 3, Mar. 2001, pp. 554-562.

Wyglinski, Alexander M., et al., "An Efficient Bit Allocation for Multicarrier Modulation," IEEE Wireless Communication, Networking Conference, Atlanta, GA, Mar. 2004, 4 pgs.

"Draft Standard," Network and Customer Installation Interfaces-Asymmetric Digital Subscriber Line (ADSL) Metallic Interface, Draft American National Standard for Telecommunications, Alliance for Telecommunications Industry Solutions, T1.413-1998.

Krongold, Brian S., et al., "Computationally Efficient Optimal Power Allocation Algorithms for Multicarrier Communication Systems," IEEE Trans. on Communications, vol. 48, pp. 23-27, Jan. 2000.

Barreto, Andre Noll, et al., "Adaptive Bit Loading for Wireless OFDM Systems," IEEE International Symposium on Personal, Indoor and Mobile Radio Communications, Oct. 2001.

Milosevic et al., "Simultaneous Multichannel Time Domain Equalizer Design Based on the Maximum Composite Shortening SNR". Dept. of Electrical and Computer Eng., The University of Texas, Austin Texas, Prior to filing date of current application, pp. 5 total.

Ana Garcia Armada et al., "Multi-User Constant-Energy Bit Loading for M-PSK-Modulated Orthogonal Frequency Division Multiplexing", © 2002 IEEE, pp. 526-530.

Misao Fukuda et al., "A Line Terminating LSI Using Echo Cancelling Method for ISDN Subscriber Loop Transmission". IEEE Journal on Selected Areas in Communications, vol. 6, No. 3, Apr. 1988, pp. 476-483.

Cheng-Shing Wu et al., "A Novel Cost-Effective Multi-Path Adaptive Interpolated FIR (IFIR)-Based Echo Canceller", © 2000 IEEE, pp. V-453-V-456.

Ranjan V. Sonalkar et al., "Shannon Capacity of Frequency-Overlapped Digital Subscriber Loop Channels", © 2002 IEEE, pp. 1741-1745.

Ivan A. Perez-Alvarez et al., "A Differential Error Reference Adaptive Echo Canceller for Multilevel PAM Line Codes" Work supported by National Project T1C95-0026, © 1996, IEEE, pp. 1707-1710.

Nadeem Ahmed et al., "Optimal Transmit Spectra for Communication in the Presence of Crosstalk and Imperfect Echo Cancellation", Copyright 2001 IEEE, pp. 17-21.

* cited by examiner

MULTICARRIER COMMUNICATION USING A TIME DOMAIN EQUALIZING FILTER

TECHNICAL FIELD

This disclosure relates generally to communication systems, and more particularly an aspect of the disclosure relates to a multicarrier communication system.

BACKGROUND

A Discrete Multi-Tone (DMT) communication system carries information from a transmitter to a receiver over a number of tones. The tones are also commonly referred to as sub-carriers or sub-channels. The tones use a modulation method in which the available bandwidth of a communication channel, such as twisted-pair copper media, is divided into these numerous sub channels.

In the receiver, the data for each sub channel is typically extracted from the time-domain data by taking the Fourier transform of a block of samples from the multiple tone signal. Since the communication channel frequency response is not flat, the impulse response of the channel has non-zero width that causes inter-symbol interference (ISI). The ISI results from the transmitter generating a narrow well defined pulse in time, such as a rectangular shaped pulse, and by the point in time the pulse travels over the communication channel and the receiver detects and samples this pulse, the shape of the pulse has changed to a rippling wave many times the width in time of the initial pulse width. The ISI causes interdependency between successive blocks of received data such that a simple Fourier transform of each block does not correctly decode the transmitted data anymore. Thus, a first block of sampled time-domain data may slightly overlap in time with the next block of sampled time-domain data corrupting the transmitted data.

Typically, the multi-tone communication system uses filters in the receiver to retrieve the transmitted information and to minimize the ISI errors. A Time-domain Equalizer (TEQ) may employ a number of algorithms to calculate the TEQ coefficients that focus on different communication characteristics such as a signal-to-noise ratio (SNR), minimizing the inter-symbol interference, minimizing a mean-square error between a target channel and the actual channel.

Some of these algorithms try to maximize the overall signal-to-noise ratio (SNR). These algorithms tend to be very complex and not suitable for real-time implementations. A TEQ filter may use a minimum mean-square error (MMSE) algorithm to solve for TEQ filter coefficients that are based on the assumption of a known channel delay value, d to aid in retrieving the transmitted information. Other algorithms, try to minimize the inter-symbol interference (MIN-ISI) of the channel. The main objective in these algorithms is to minimize the total power of the final impulse response outside a guard period. Although these MIN-ISI algorithms are easier to implement, the resulting performance after applying these algorithms to the multiple tone signal is usually lower than applying a MMSE solution.

SUMMARY

Various methods and apparatus are described that use a filter. A receiver containing this filter may be configured to receive multi-tone signals. The receiver has a Time Domain Equalizer filter employing an algorithm to shorten the length of incoming impulse response for all of the frequencies in the channel to equal to or less than a guard period by calculating a minimum mean square error solution in combination with measuring an inter-symbol interference of a channel.

DETAILED DESCRIPTION

In the following detailed description of embodiments of the invention, reference is made to the accompanying drawings in which like references indicate similar elements, and in which, by way of illustration, specific embodiments in which the invention may be practiced are shown. These embodiments are understood that logical, mechanical, electrical, functional and other changes may be made without departing from the scope of the present invention. The following detailed description is, therefore, not to be taken in a limiting sense, and the scope of the present invention is defined only by the appended claims.

In general, various methods and apparatus are described that use a filter. A receiver containing this filter may be configured to receive multi-tone signals. The receiver has a Time Domain Equalizer filter employing an algorithm to shorten the length of incoming impulse response for all of the frequencies in the channel to equal to or less than a guard period by calculating a minimum mean square error solution in combination with measuring an inter-symbol interference of a channel. The receiver minimizes two cost functions: the mean square error; and the inter-symbol interference of the communication channel. Note, the impulse response is defined for all of the frequencies rather than for a single frequency.

Figure 1:
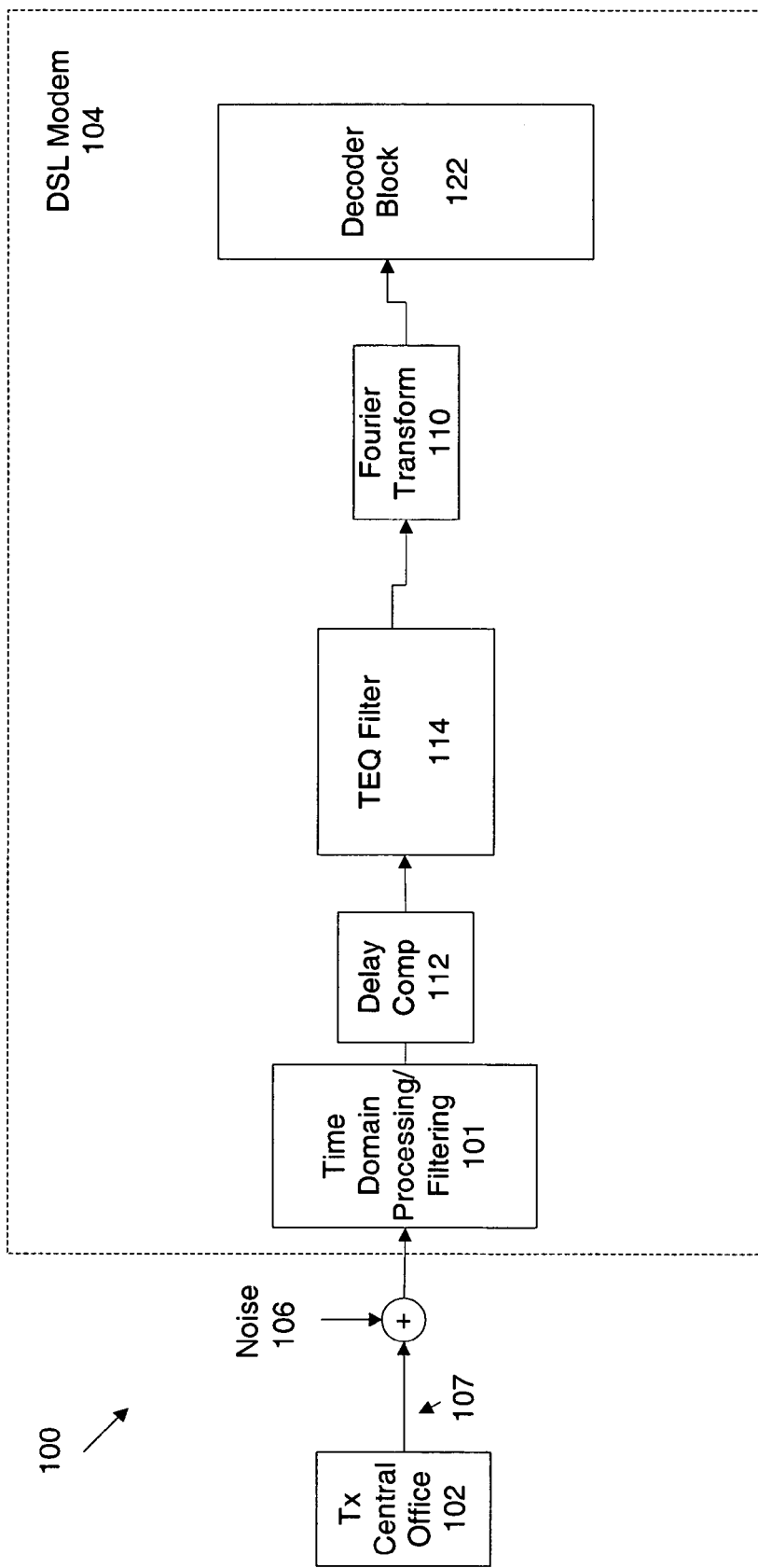
FIG. 1 illustrates a block diagram of an embodiment of a Discrete Multi-Tone communication system using receiver having a Time Domain Equalizer filter.

FIG. 1 illustrates a block diagram of an embodiment of a Discrete Multi-Tone (DMT) communication system containing a multiple tone receiver using a Time Domain Equalizer filter. The DMT communication system carries information from a transmitter 102 through a communication channel 107 (such as a telephone line) to a receiver 104, such as a DSL modem, with a number of sub-carriers i.e.

tones. In an Asymmetric Digital Subscriber Line (ADSL) system, each tone may be modulated using a Quadrature Amplitude Modulation (QAM) scheme. The transmitter 102 at a central office may transmit frames within the multicarrier signal that each carry 512 samples of data to the receiver 104 using the QAM scheme. The transmitter may separate successive frames of 512 samples of data with a guard period of 32 samples of non-data. As the multicarrier signal travels to the DSL modem 104 through the transmission channel 107, the signal is potentially corrupted by various noise sources 106 including inter-symbol interference (ISI).

The receiver 104 may have a Time Domain Processing/Filtering module 101, a delay compensation module 112, a Time-domain Equalizer (TEQ) filter 114, a Fourier transform block 110, a data decoder module 120, as well as other modules. Once the multiple tone signal is received and processed by the Time Domain Processing/Filtering module 101, the delay compensation module 112 determines an initial delay value to apply to the impulse response. The TEQ filter 114 receives the output of the delay compensation module 112. The TEQ filter 114 is a filter that shortens the channel impulse response to mitigate the inter-symbol interference (ISI). The Time domain equalization eliminates the ISI from the received DMT signal by shortening the channel impulse response to approximately the width in samples of a guard period generated by the transmitter 102. In an embodiment, the length in samples of the shortened impulse response may equal the duration of the guard period plus one sample. The TEQ filter 114 may apply an algorithm to minimize the mean square error and inter-symbol interference simultaneously on the multiple tone signal in order to shorten the sample length of the multiple tone signal. The Fast Fourier Transform block 110 receives the output of the TEQ filter 114.

The transmitter 102 and receiver 104 may cooperate to minimize ISI corrupting successive blocks of sampled time-domain data by two measures. First, the transmitter 102 inserts a guard period between successive blocks of data to reduce the interaction between them. Second, the receiver 104 uses the Time-domain Equalizer (TEQ) filter 110 in the receive path to shorten the channel impulse response so that the length of the incoming channel impulse response is equal to or less than the guard period. In an ADSL system, for instance, the downstream transmission block size of time-domain data is 512 samples in width and the guard period is 32 samples in width. The upstream transmission block size of time-domain data is 64 samples in width and the guard period is 4 samples in width. The TEQ filter 110 shortens the incoming impulse response of the multiple tone signal such that most of the signal's power is confined to at most 33 samples in width.

The Time Domain Equalizer filter 114 shortens the length of incoming impulse responses of the channel frequency response by calculating a minimum mean square error solution in combination with measuring an inter-symbol interference of a channel to jointly minimizing the mean square error and the inter-symbol interference. The TEQ filter algorithm combines an MMSE criterion to calculate the filter coefficients and a MIN-ISI criterion for the delay calculation. The TEQ filter algorithm generates the minimum mean-square error given the channel delay. The TEQ filter algorithm also generates the minimum ISI for a set of candidate delay values.

The delay compensation module 112 supplies this set of delay values for the minimum mean square error solution to the TEQ filter 114. The TEQ filter 114 measures the impulse response at the output of the TEQ filter 114. The TEQ calculates the ISI power ratio ($IPR_i$) as the ratio of the power of the impulse response outside the guard period to the power inside the guard period. The delay value from the set of candidate delay values that produces the minimum of ISI power ratio is the best delay value to use when determining TEQ. coefficients.

The Fast Fourier Transform block 110 receives the output of the TEQ filter 114. The Fast Fourier Transform block 110 transforms the data samples of the multiple tone signal from the time-domain to the frequency-domain, such that a stream of data for each sub-carrier may be output from the Fast Fourier Transform block 110. Essentially, the Fast Fourier Transform block 110 acts as a demodulator to separate data corresponding to each tone in the multiple tone signal. In one embodiment, processing of each sub-carrier may be performed in parallel or in series. The Fast Fourier Transform (FFT) block 110 may sample a sine and cosine of the amplitude of a tone over time to create the time domain data. The Fourier transform correlates the time domain data of the tone to the actual sine and cosine of the amplitude of the tone over time.

The resultant signal from the Fast Fourier Transform (FFT) block 110 is sent to the data decoder module 122 in order to decode the data samples transmitted by the transmitter.

FIGS. 2a-2c illustrate graphs of an example channel impulse response for all of the frequencies in the channel as the multi-carrier signal progresses before and after the TEQ filter. The graphs illustrate the amplitude of the impulse response over time indicated by 0-200 samples.

Figure 2:
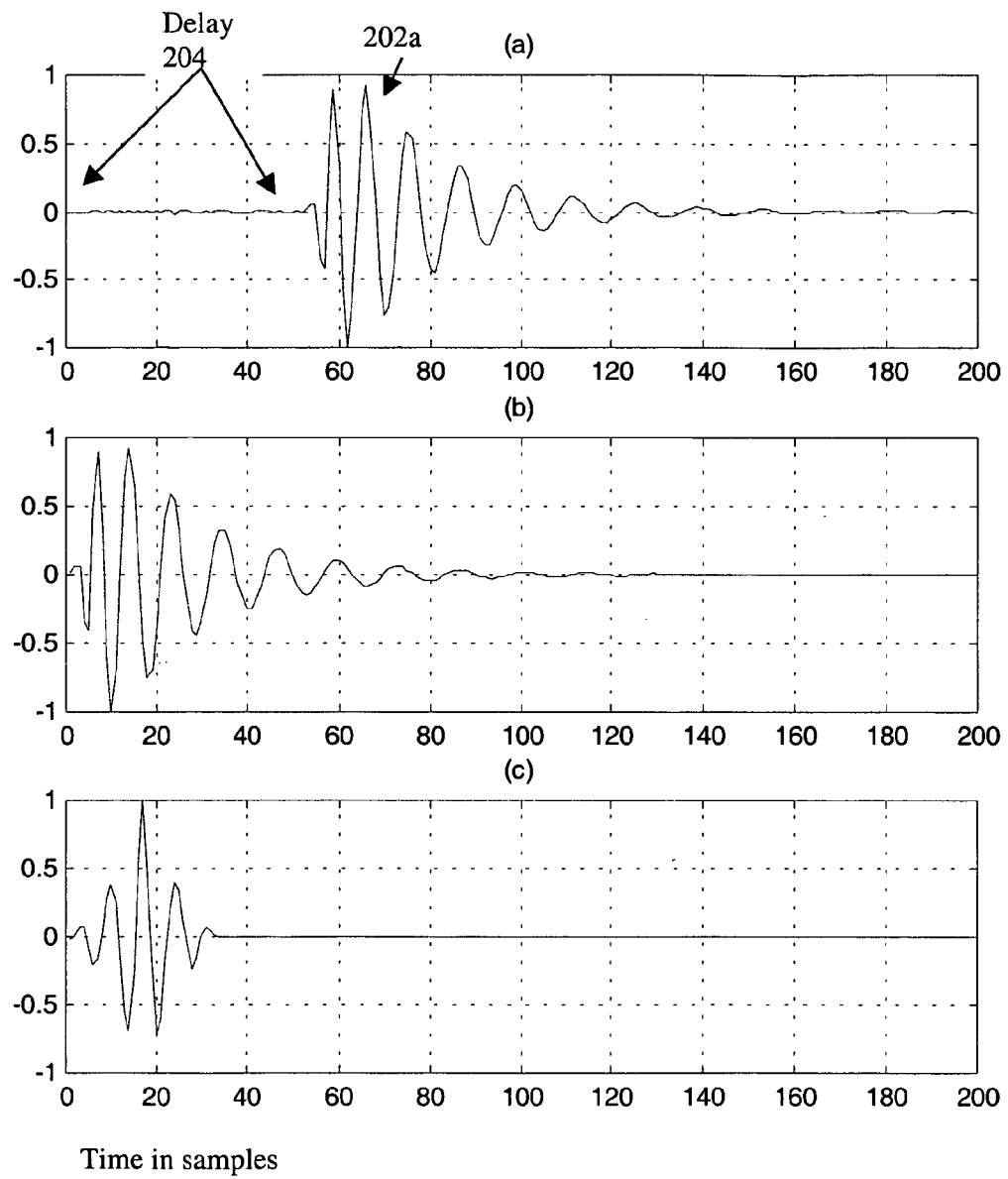
FIGS. 2a-2c illustrate graphs of an example channel impulse responses for the entire frequency of the channel as the multi-carrier signal progresses before and after the TEQ filter.

Generally, two sets of parameters uniquely identify a TEQ filter: the filter coefficients, and the center delay. The center delay shifts the impulse response to the beginning of the received block. The filter coefficients shorten the impulse response so that the signal fits within the guard period. FIG. 2 illustrates the effect of each of these two sets of parameters on the channel impulse response. FIGS. 2a-2c illustrate the channel impulse response 2a) at the TEQ filter input, 2b) after compensation for channel delay by a TEQ algorithm, and 2c) after proper shortening at the output of the TEQ filter.

In FIG. 2-a, the channel impulse response 202a as received by the receiver is shown to be fairly long and with a non-zero delay period 204. The channel impulse response 202a has lost the narrow shape the signal was originally transmitted with. The actual delay period 204 exists between the time of the first sample of the impulse response and the beginning of the change in the amplitude of the impulse response 202a.

As discussed, the finite impulse response filter of the TEQ filter takes samples of the impulse response to generate an output signal from the TEQ filter. In FIGS. 2b and 2c, the TEQ filter applies an algorithm the signal to shorten the impulse response such that most of its power is confined to approximately the sample width of the guard period.

FIG. 2-b illustrates the TEQ algorithm using the calculated delay compensation from the TEQ algorithm to shift the impulse response to the beginning of a block of samples.

FIG. 2-c illustrates the TEQ algorithm using the coefficients of the TEQ filter to shorten the length of the overall impulse response to approximately equal to or smaller than the width of the guard period, i.e. 32 samples.

The TEQ filter algorithm is attempting to determine a number of coefficients for TEQ filter so that the signal results from the output of the TEQ filter are shortened to a duration of a number of samples, which can be at most equal to the length in samples of a cyclic prefix/guard period plus one.

Figure 3:
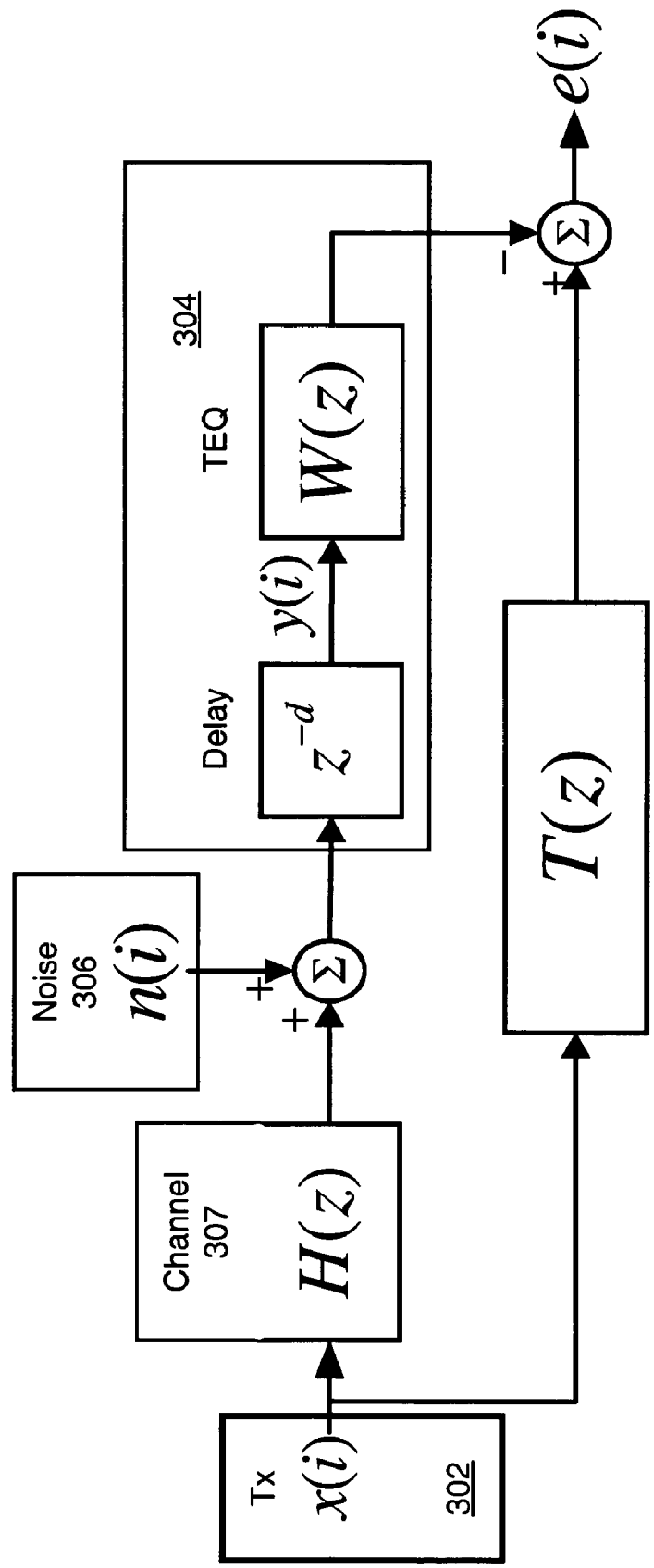
FIG. 3 illustrates a simplified block diagram of an embodiment that generates the equivalent combined error from noise and ISI.

FIG. 3 illustrates a simplified block diagram of an embodiment that generates the equivalent combined error from noise and ISI. In this figure, the channel module H(z) 307 models the downstream channel response. The transmit module x(i) 302 models the central office transmitted time-domain samples. The receiver module 304 W(z) models the TEQ filter and d is the channel delay. The noise module n(i) 306 models the value of noise present in the system. T(z)325 is the target channel impulse response (TIR) at the output of the TEQ filter. The difference between the output of the TEQ filter 304 and the output of the target channel 325 is the total error to be minimized. This error consists of both ISI and background noise.

In the mean-square-error (MSE) minimization approach, a designer may begin with the selection of a theoretical impulse response properly shortened known as target-impulse response (TIR). The TEQ coefficients of the TEQ filter are then selected so that the combined impulse response of the channel and equalizer are as close as possible to the TIR. The criterion used for the selection of the TIR and TEQ coefficients typically vary. Yet, a goal of a mean-square-error (MSE) minimization approach is to jointly optimize the TIR and TEQ so that the difference between the outputs of the TEQ and TIR is minimized in the MSE sense.

Thus, the target channel is not a real channel. The target channel is part of the modeling of the system. The algorithm used by the TEQ filter attempts to have the combined TEQ and channel impulse response be as close as possible to the modeled impulse response of the target channel. The target channel response has a sample length less than or equal to the guard period—which is 32 in an ADSL system. The finite filters of the TEQ channel and delay modules represent the value of the current sample and the values of the past samples, for example past 32 samples, over time with a weighting factor. The target channel response 325 may set the center tap/coefficient of the target channel, $t_0$, to a fixed value such as unity to avoid the trivial all zero solution for the TEQ filter. Thus, the tap/coefficient of one of the thirty-two previous samples has its coefficient set to a fixed value such as unity/one.

The target channel response, by definition, has a finite length less than or equal to the guard period. The TEQ is sometimes implemented as a Finite Impulse Response (FIR) filter. This means the TEQ filter output is a weighted sum of the current input sample and a finite number of past input samples. The TEQ design algorithm finds the weighting coefficients (or filter taps) such that the combined TEQ/channel response is as close to the target channel response as possible.

In many implementations, both TEQ and target channel are assumed to have finite impulse responses as:

$$W(z) = \sum_{i=0}^{N-1} w_i z^{-i} \quad (1)$$

$$T(z) = 1 - \sum_{i=-M}^{1} t_i z^{-i} - \sum_{i=1}^{M} t_i z^{-i}$$

where [$z^{-1}$ is the unit delay operator,] $\{w_i | i=0 \ldots N-1\}$ are N TEQ taps and $\{-t_i | i=-M \ldots +M\}$ are 2M+1 taps of the target channel response. In an ADSL system with a guard period of 32 samples in the downstream direction, M=16. Note, that the center tap of the target channel, $t_0$, is set to unity to avoid the trivial all zero solution for the TEQ filter. Note, the unit-tap constraint is one of the many other constraints that can be put in to avoid the trivial solution for the TEQ. The unit-tap constraint, however, is much easier to implement than some of the other constraints.

From the block diagram of FIG. 3, the error samples can be written as $$e(n) = x(n) - \left( \sum_{i=0}^{N-1} w_i y(n-i) + \sum_{i=-M}^{1} t_i x(n-i) + \sum_{i=1}^{M} t_i x(n-i) \right) \quad (2)$$

Figure 4A:
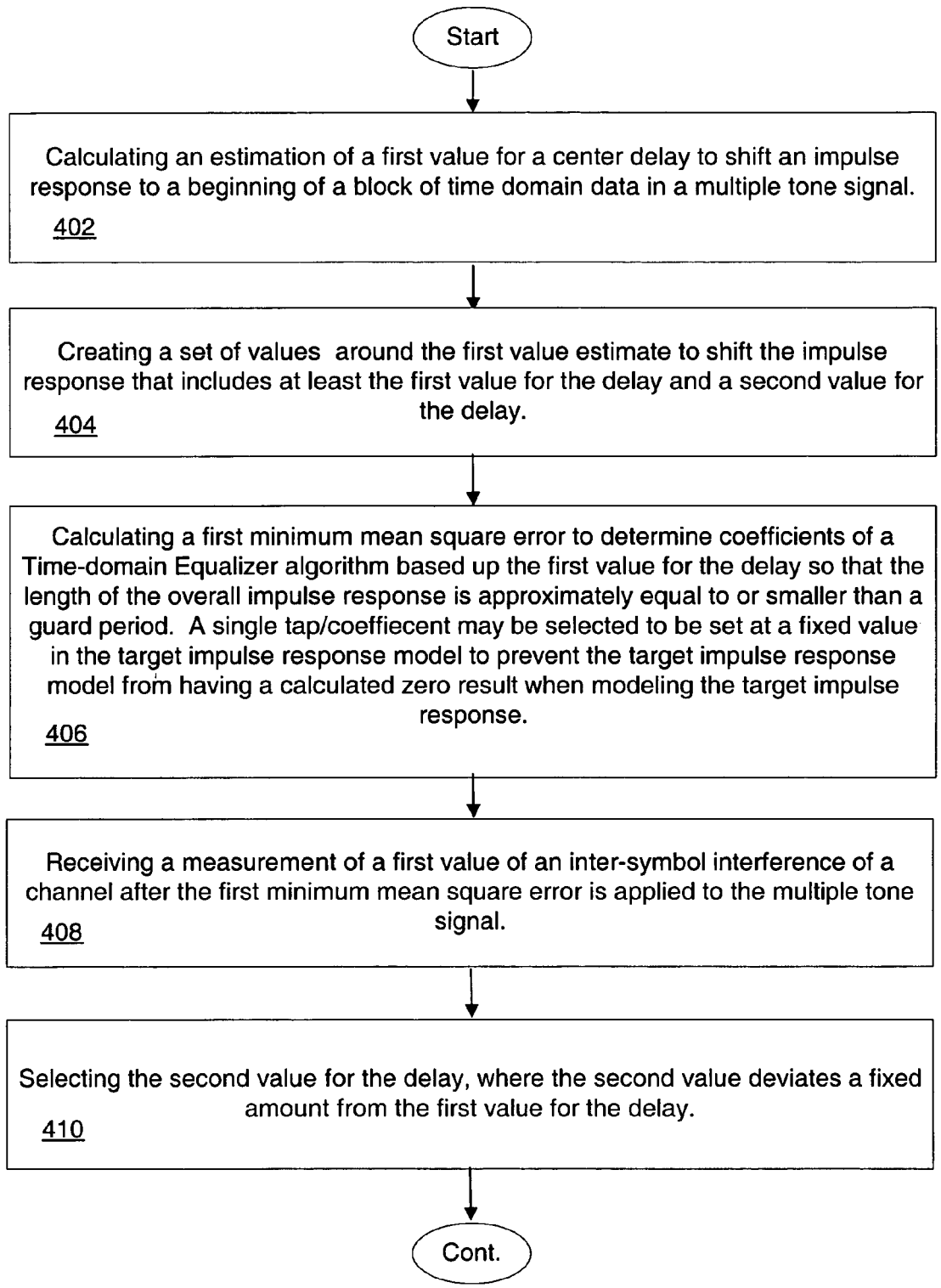
FIGS. 4a and 4b illustrate an embodiment of a method to design a TEQ filter that minimizes the mean square error and inter-symbol interference simultaneously.
Figure 4B:
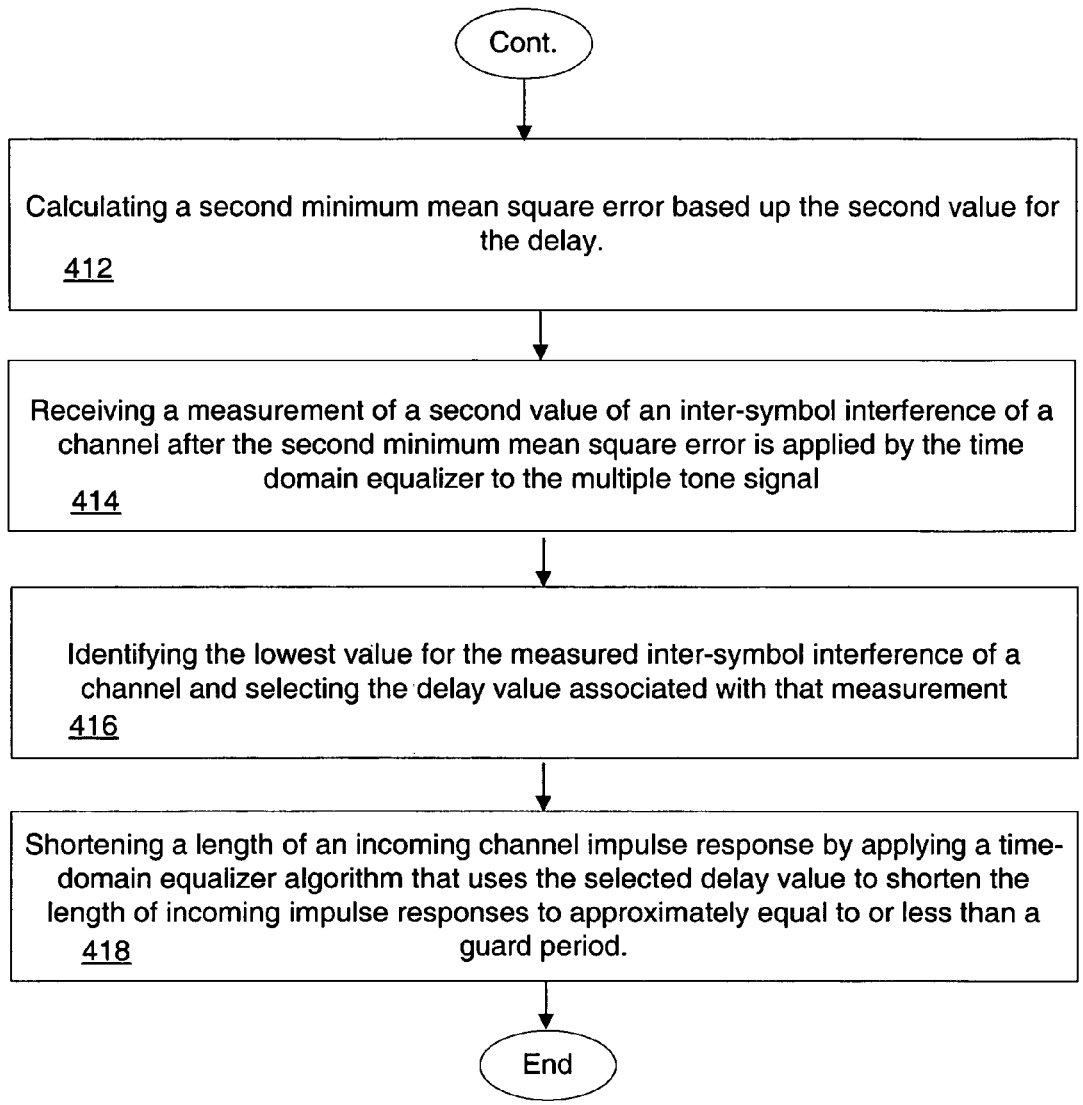

FIGS. 4a and 4b illustrate an embodiment of a method to design a TEQ filter that minimizes the mean square error and inter-symbol interference simultaneously.

The method 400 illustrated in FIGS. 4a and 4b constitutes a computer program made up of computer-executable instructions illustrated as blocks (operations) from 402 until 418. Describing the method by reference to a flow chart enables one skilled in the art to develop such programs including such instructions to carry out the methods on suitably configured computers (the processor of the computer executing the instructions from computer-readable media, including memory). The computer-executable instructions may be written in a computer programming language or may be embodied in firmware logic. If written in a programming language conforming to a recognized standard, such instructions can be executed on a variety of hardware platforms and for interface to a variety of operating systems. In addition, the computer program is not described with reference to any particular programming language. It will be appreciated that a variety of programming languages may be used to implement the teachings of the invention as described herein. Furthermore, it is common in the art to speak of software, in one form or another (e.g., program, procedure, process, application, module, logic . . . ), as taking an action or causing a result. Such expressions are merely a shorthand way of saying that execution of the software by a computer causes the processor of the computer to perform an action or produce a result. It will be appreciated that more or fewer processes may be incorporated into the method illustrated in FIGS. 4a and 4b without departing from the scope of the invention and that no particular order is implied by the arrangement of blocks shown and described herein. For example, in one embodiment, processes represented by blocks may be performed in parallel.

Overall, the MMSE solution for TEQ filter coefficients may be based on using a calculated channel delay value, d that results in the minimum measured ISI power. The algorithm of the TEQ filter for the receiver may consists of the following blocks.

In block 402, the computer program calculates an estimation of an initial center value for a center delay to shift an impulse response to the beginning of a block of time domain data in the multiple tone signal. The estimated initial center value for the channel delay of the downstream communication channel may be based on a various methods.

For example, the initial center value may be based on locating a window of time that covers samples of the multiple tone signal with a highest power of channel impulse response in the sample duration. The initial center value may also be based on the best linear fit to the phase of the channel frequency response. The initial center value may also be based on other similar methods as well.

In block 404, the computer program creates a set of values for the delay around the initial center value estimate for the center delay. The set of values include at least the initial center value for the delay and one or more values for the delay spaced a fix amount away from the initial value.

Thus, a candidate set of delay values is formed around the initial center value. The candidate set of delay values, D, are in the neighborhood of center delay as follows:

$$D=\{d_0-\delta_l, \ldots, d_0-1, d_0, d_0+1, \ldots, d_0-\delta_h\}$$

where $\delta_l$ and $\delta_h$ denote the lower and higher bounds of the delay candidate set, respectively.

In block 406, the computer program calculates a first minimum mean square error solution to determine coefficients of a Time-domain Equalizer algorithm based up the initial value for the delay so that the length of the overall impulse response is approximately equal to or smaller than a guard period. The MMSE calculation of filter coefficients may be constrained by setting a sample of target impulse response to unity. This reduces the complexity of the algorithm substantially. Thus, rather than the sum of all of the coefficients equaling a unit power constraint such as unity, a single coefficient of the thirty two or so samples is set to equal some fixed value such as one to prevent the solution from resulting in a zero.

In many implementations, both TEQ and target channel are assumed to have finite impulse responses as:

$$W(z) = \sum_{i=0}^{N-1} w_i z^{-i} \tag{1}$$

$$T(z) = 1 - \sum_{i=-M}^{1} t_i z^{-i} - \sum_{i=1}^{M} t_i z^{-i}$$

Where H(z) represents the downstream channel response and x(i) is the time-domain transmit samples. W(z) is the TEQ filter and d is the channel delay. T(z) is the target channel response at the output of the TEQ. The difference between the output of TEQ and the output of the target channel is the total error to be minimized.

Further, $\{w_i|i=0 \ldots N-1\}$ are N TEQ taps and $\{-t_i|i=-M \ldots +M\}$ are 2M+1 taps of the target channel response. In an ADSL system with a guard period of 32 samples in downstream direction, M=16. Note that the center tap of the target channel, $t_0$, is set to unity to avoid the trivial all zero solution for the TEQ filter.

From the block diagram of FIG. 2, the error samples can be written as $$e(n) = x(n) - \left( \sum_{i=0}^{N-1} w_i y(n-i) + \sum_{i=-M}^{1} t_i x(n-i) + \sum_{i=1}^{M} t_i x(n-i) \right) \tag{2}$$

The design goal may be to choose $w_i$ and $t_i$ such that the power of error (or the its mean square value) is minimized. To obtain the MMSE solution, one needs to solve the following set of linear equations.

$$\begin{bmatrix} r_{xx}(0) & \cdots & r_{xx}(M-1) & r_{xx}(M+1) & \cdots & r_{xx}(2M) & r_{xy}(0) & \cdots & r_{xy}(N-1) \\ \vdots & \ddots & \vdots & \vdots & \ddots & \vdots & \vdots & \ddots & \vdots \\ r_{xx}(M-1) & \cdots & r_{xx}(0) & r_{xx}(+2) & \cdots & r_{xx}(M+1) & r_{xy}(-M+1) & \cdots & r_{xy}(-M+N) \\ r_{xx}(M+1) & \cdots & r_{xx}(2) & r_{xx}(0) & \cdots & r_{xx}(M-1) & r_{xy}(-M-1) & \cdots & r_{xy}(-M+N-2) \\ \vdots & \ddots & \vdots & \vdots & \ddots & \vdots & \vdots & \ddots & \vdots \\ r_{xx}(2M) & \cdots & r_{xx}(M+1) & r_{xx}(M-1) & \cdots & r_{xx}(0) & r_{xy}(-2M) & \cdots & r_{xy}(-2M+N-1) \\ r_{xy}(0) & \cdots & r_{xy}(-M+1) & r_{xy}(-M-1) & \cdots & r_{xy}(-2M) & r_{yy}(0) & \cdots & r_{yy}(N-1) \\ \vdots & \ddots & \vdots & \vdots & \ddots & \vdots & \vdots & \ddots & \vdots \\ r_{xy}(N-1) & \cdots & r_{xy}(-M+N) & r_{xy}(-M+N-2) & \cdots & r_{xy}(-2M+N-2) & r_{yy}(N-1) & \cdots & r_{yy}(0) \end{bmatrix} \times$$

-continued $$\begin{bmatrix} t_{-M} \\ \vdots \\ t_{-1} \\ t_{+1} \\ \vdots \\ t_{+M} \\ w_0 \\ \vdots \\ w_{N-1} \end{bmatrix} = \begin{bmatrix} r_{xx}(M) \\ \vdots \\ r_{xx}(1) \\ r_{xx}(-1) \\ \vdots \\ r_{xx}(-M) \\ r_{xx}(-M) \\ \vdots \\ r_{xx}(N-1-M) \end{bmatrix}$$

where N is the number of TEQ taps, M is half the number of samples in a guard period and $r_{xx}$, $r_{yy}$ and $r_{xy}$ are auto-correlation and cross-correlation functions defined as follows:

$r_{xx}(k) = \Sigma_n x(n)x(n-k)$ $r_{yy}(k) = \Sigma_n y(n)y(n-k)$ $r_{xy}(k) = \Sigma_n x(n)y(n-k)$  (4)

When modeling a target impulse response, a single tap/coefficient may be set at a fixed value in the target impulse response model to prevent the algorithm resulting in the trivial all zero filter solution. Thus, the MMSE calculation of filter coefficients may be constrained by setting a sample of target impulse response to unity. This particular constraint reduces the complexity of the algorithm substantially.

In block 408, the computer program receives a measurement of a first value of an inter-symbol interference of a channel after the first minimum mean square error is applied by the time domain equalizer to the multiple tone signal.

In block 410, the computer program selects a second value for the delay from the set of delay values. The second value deviates a fixed amount from the first value for the delay. The computer program recalculates the MMSE solution based on the set of delay values. Overall, The algorithm of the TEQ filter tries to achieve a maximum bit rate over the channel, given an acceptable level of bit-error probability.

In block 412, the computer program calculates a second minimum mean square error based up the second value for the delay to achieve a best/minimum measured ISI power. For each value of delay in the candidate set, the best MMSE TEQ filter is calculated. Thus, if ten delay values exist in the candidate set, then the computer program calculates a ten minimum mean square error solutions, each based on its own delay value. The ISI power ratio, for this TEQ filter and the corresponding delay value, is calculated as the ratio of the power of the overall impulse response inside guard period to the power outside guard period.

In block 414, the computer program receives a measurement of a second value of an inter-symbol interference of a channel after the second minimum mean square error is applied by the time domain equalizer to the multiple tone signal. For each value of delay in the candidate set, the best MMSE TEQ filter is calculated based on that delay. Also, the impulse response resulting from that MMSE TEQ filter is measured to determine the ISI power out of the guard period.

Thus, if ten delay values exist in the candidate set, then ten measurements of the ISI power would occur.

In block 416, the computer program identifies the lowest value for the measured inter-symbol interference of a channel and selects the delay value associated with that measurement. The delay value that results in minimum ISI power and its corresponding TEQ filter are chosen as the best set of parameters. The computer program finds the value of $l_{mir}$ corresponding to the minimum of ISI power ratio.

In block 418, the computer program shortens a length of incoming channel impulse response by applying a time-domain equalizer algorithm that uses the selected delay value to shorten the length of incoming impulse responses to approximately equal to or less than a guard period. Ultimately, the computer program selects the final delay value and the TEQ filter coefficients with the best MMSE and MIN-ISI performance, $d_{l\ min}$ and $TEQ_{l\ min}$.

Embodiments of the present invention are applicable types of DSL systems, such as, but not limited to, ADSL, Rate Adaptive DSL (RADSL), Very High Bit Rate DSL (VDSL or VHDSL), High Bit Rate DSL (HDSL), Symmetric DSL (SDSL), ISDN DSL (IDSL), and Orthogonal Frequency Division Multiplexing (OFDM), as well as communications systems using other modulation techniques. Embodiments of the present invention are applicable to communication systems employing multiple tone carrier signals in general.

The above description of illustrated embodiments of the invention, including what is described in the Abstract, is not intended to be exhaustive or to limit the invention to the precise forms or embodiments disclosed. While specific embodiments of, and examples for, the invention are described herein for illustrative purposes, various equivalent modifications are possible within the scope of the invention, as those skilled in the relevant art will recognize. These modifications can be made to embodiments of the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. An apparatus, comprising:
a receiver configured to receive multi-tone signals, wherein the receiver has a Time Domain Equalizer filter employing an algorithm to shorten a length of an incoming impulse response to equal to or less than a guard period by calculating a minimum mean square error solution in combination with measuring an inter-symbol interference of a channel, wherein the algorithm is further configured to calculate an estimation of a first value for a center delay to shift an impulse response to a beginning of a block of time domain data in a multiple tone signal;
create a set of values around the first value estimate to shift the impulse response that includes at least the first value for the delay and a second value for the delay;
calculate a first minimum mean square error to determine coefficients of the Time Domain Equalizer filter based up the first value for the delay so that the length of the overall impulse response is approximately equal to or smaller than a guard period;
receive a measurement of a first value of an inter-symbol interference of a channel after the first minimum mean square error is applied to the multiple tone signal;
select the second value for the delay, where the second value deviates a fixed amount from the first value for the delay; and
calculate a second minimum mean square error based on the second value for the delay.

2. The apparatus of claim 1, wherein the Time Domain Equalizer filter uses the filter coefficients to make the impulse response be approximately equal in width to the guard period.

3. The apparatus of claim 1, further comprising:
a delay compensation module to determine the first value for the center delay to apply to the impulse response as well as supply a set of delay values for the minimum mean square error solution.

4. The apparatus of claim 3, wherein the Time Domain Equalizer filter recalculates minimum mean square error based on a set of two or more delay values.

5. The apparatus of claim 1, wherein the Time Domain Equalizer filter uses a matrix equation to determine a solution for the minimum mean-square error.

6. The apparatus of claim 5, wherein the matrix equation is as follows:

$$\begin{bmatrix} r_{xx}(0) & \cdots & r_{xx}(M-1) & r_{xx}(M+1) & \cdots & r_{xx}(2M) & r_{xy}(0) & \cdots & r_{xy}(N-1) \\ \vdots & \ddots & \vdots & \vdots & \ddots & \vdots & \vdots & \ddots & \vdots \\ r_{xx}(M-1) & \cdots & r_{xx}(0) & r_{xx}(+2) & \cdots & r_{xx}(M+1) & r_{xy}(-M+1) & \cdots & r_{xy}(-M+N) \\ r_{xx}(M+1) & \cdots & r_{xx}(2) & r_{xx}(0) & \cdots & r_{xx}(M-1) & r_{xy}(-M-1) & \cdots & r_{xy}(-M+N-2) \\ \vdots & \ddots & \vdots & \vdots & \ddots & \vdots & \vdots & \ddots & \vdots \\ r_{xx}(2M) & \cdots & r_{xx}(M+1) & r_{xx}(M-1) & \cdots & r_{xx}(0) & r_{xy}(-2M) & \cdots & r_{xy}(-2M+N-1) \\ r_{xy}(0) & \cdots & r_{xy}(-M+1) & r_{xy}(-M-1) & \cdots & r_{xy}(-2M) & r_{yy}(0) & \cdots & r_{yy}(N-1) \\ \vdots & \ddots & \vdots & \vdots & \ddots & \vdots & \vdots & \ddots & \vdots \\ r_{xy}(N-1) & \cdots & r_{xy}(-M+N) & r_{xy}(-M+N-2) & \cdots & r_{xy}(-2M+N-2) & r_{yy}(N-1) & \cdots & r_{yy}(0) \end{bmatrix} \times$$

$$\begin{bmatrix} t_{-M} \\ \vdots \\ t_{-1} \\ t_{+1} \\ \vdots \\ t_{+M} \\ w_0 \\ \vdots \\ w_{N-1} \end{bmatrix} = \begin{bmatrix} r_{xx}(M) \\ \vdots \\ r_{xx}(1) \\ r_{xx}(-1) \\ \vdots \\ r_{xx}(-M) \\ r_{xx}(-M) \\ \vdots \\ r_{xx}(N-1-M) \end{bmatrix}$$

where $r_{xx}$ and $r_{yy}$ are autocorrelation functions and $r_{xy}$ is a cross-correlation function, N is a number of Time Domain Equalizing taps, and M is half a number of samples in a guard period.

7. A Digital Subscriber Line modem containing the apparatus of claim 5.

8. A method, comprising:
calculating an estimation of a first value for a center delay to shift an impulse response to a beginning of a block of time domain data in a multiple tone signal;
creating a set of values around the first value estimate to shift the impulse response that includes at least the first value for the delay and a second value for the delay;
calculating a first minimum mean square error to determine coefficients of a Time Domain Equalizer algorithm based up the first value for the delay so that the length of the overall impulse response is approximately equal to or smaller than a guard period;
receiving a measurement of a first value of an inter-symbol interference of a channel after the first minimum mean square error is applied to the multiple tone signal; selecting the second value for the delay, where the second value deviates a fixed amount from the first value for the delay; and
calculating a second minimum mean square error based up the second value for the delay.

9. The method of claim 8, further comprising:
receiving a measurement of a second value of an inter-symbol interference of a channel after the second minimum mean square error is applied to the multiple tone signal;
identifying the lowest value for the measured inter-symbol interference of a channel and selecting the delay value associated with that measurement; and
shortening a length of an incoming channel impulse response by applying a time-domain equalizer algorithm that uses the selected delay value to shorten the length of incoming impulse responses to approximately equal to or less than a guard period.

10. The method of claim 8, further comprising:
selecting a single tap to be set at a fixed value in a target impulse response model to prevent the target impulse response model from having a calculated zero result when modeling the target impulse response.

11. The method of claim 8, wherein the estimation of the first value for a center delay value in the set of delay values is based on locating a window of time that covers samples of the multiple tone signal with a highest power of channel impulse response.

12. A machine-readable medium storing executable instructions to cause a device to perform operations, comprising:
calculating an estimation of a first value for a center delay to shift an impulse response to a beginning of a block of time domain data in a multiple tone signal;
creating a set of values around the first value estimate to shift the impulse response that includes at least the first value for the delay and a second value for the delay;
calculating a first minimum mean square error to determine coefficients of a Time Domain Equalizer algorithm based up the first value for the delay so that the length of the overall impulse response is approximately equal to or smaller than a guard period;
receiving a measurement of a first value of an inter-symbol interference of a channel after the first minimum mean square error is applied to the multiple tone signal;
selecting the second value for the delay, where the second value deviates a fixed amount from the first value for the delay; and
calculating a second minimum mean square error based on the second value for the delay.

13. The article of manufacture of claim 12, wherein the stored instructions to cause the device to perform further operations, comprising:
receiving a measurement of a second value of an inter-symbol interference of a channel after the second minimum mean square error is applied to the multiple tone signal;
identifying the lowest value for the measured inter-symbol interference of a channel and selecting the delay value associated with that measurement; and
shortening a length of an incoming channel impulse response by applying a time-domain equalizer algorithm that uses the selected delay value to shorten the length of incoming impulse responses to approximately equal to or less than a guard period.

14. The article of manufacture of claim 12, wherein the stored instructions to cause the device to perform further operations, comprising:
selecting a single tap to be set at a fixed value in a target impulse response model to prevent the target impulse response model from having a calculated zero result when modeling the target impulse response.

15. The article of manufacture of claim 12, wherein the estimation of the first value for a center delay value in the set of delay values is based on locating a window of time that covers samples of the multiple tone signal with a highest power of channel impulse response.

16. An apparatus, comprising:
means for calculating an estimation of a first value for a center delay to shift an impulse response to a beginning of a block of time domain data in a multiple tone signal;
means for creating a set of values around the first value estimate to shift the impulse response that includes at least the first value for the delay and a second value for the delay;
means for calculating a first minimum mean square error to determine coefficients of a Time Domain Equalizer algorithm based up the first value for the delay so that the length of the overall impulse response is approximately equal to or smaller than a guard period;
means for receiving a measurement of a first value of an inter-symbol interference of a channel after the first minimum mean square error is applied to the multiple tone signal;
means for selecting the second value for the delay, where the second value deviates a fixed amount from the first value for the delay; and
means for calculating a second minimum mean square error based up the second value for the delay.

17. The apparatus of claim 16, further comprising:
means for receiving a measurement of a second value of an inter-symbol interference of a channel after the second minimum mean square error is applied to the multiple tone signal;
means for identifying the lowest value for the measured inter-symbol interference of a channel and selecting the delay value associated with that measurement; and
means for shortening a length of an incoming channel impulse response by applying a time-domain equalizer algorithm that uses the selected delay value to shorten the length of incoming impulse responses to approximately equal to or less than a guard period.

18. The apparatus of claim 16, further comprising:
means for selecting a single tap to be set at a fixed value in a target impulse response model to prevent the target impulse response model from having a calculated zero result when modeling the target impulse response.

19. The apparatus of claim 16, wherein the estimation of the first value for the center delay is based on a best linear fit to a phase of a channel frequency response.

\* \* \* \* \*